(12) United States Patent
Wang et al.

(10) Patent No.: US 12,318,836 B1
(45) Date of Patent: Jun. 3, 2025

(54) MULTI-PURPOSE AND SIMPLE RIVETING TOOL

(71) Applicants: Yuexiang Wang, Sichuan (CN); Shuangjiang Li, Sichuan (CN)

(72) Inventors: Yuexiang Wang, Sichuan (CN); Shuangjiang Li, Sichuan (CN)

( * ) Notice: Subject to any disclaimer, the term of this patent is extended or adjusted under 35 U.S.C. 154(b) by 0 days.

(21) Appl. No.: 18/605,807

(22) Filed: Mar. 14, 2024

(51) Int. Cl.
*B21J 15/38* (2006.01)
*F16B 5/04* (2006.01)

(52) U.S. Cl.
CPC .............. *B21J 15/383* (2013.01); *F16B 5/04* (2013.01)

(58) Field of Classification Search
CPC ........ B21J 15/383; B21J 15/386; B21J 15/10; B21J 15/14; B21J 15/20; B21J 15/30; F16B 5/04; B25B 27/0007; B25B 27/0014; B25J 15/043
See application file for complete search history.

(56) References Cited

U.S. PATENT DOCUMENTS

| | | | |
|---|---|---|---|
| 8,468,668 B2* | 6/2013 | Ko | B25B 27/0007 72/391.8 |
| 8,468,688 B2* | 6/2013 | Montena | H01R 43/28 29/745 |
| 2005/0189145 A1* | 9/2005 | Kovar | B21J 15/36 166/264 |

* cited by examiner

*Primary Examiner* — Lee A Holly
(74) *Attorney, Agent, or Firm* — Hawaii Patent Services; Nathaniel K. Fedde; Kenton N. Fedde

(57) ABSTRACT

A multi-purpose and simple riveting tool comprises a male member, a female member and at least one rotating device, wherein the male member comprises a fixing part and a riveting part; the fixing part comprises an accommodating groove with a threaded part, and the female member comprises an inner cavity with a depth; the rotating device comprises a rotating shaft, at least a part of which has a threaded part; the male member penetrates through the inner cavity, and the inner cavity is configured to only allow the male member to move axially in the inner cavity; and the rotating shaft is screwed into the accommodating groove, so that the rotating device drives the axial movement of the male member in the inner cavity when rotating around at least one rotation axis.

12 Claims, 18 Drawing Sheets

MULTI-PURPOSE AND SIMPLE RIVETING TOOL

TECHNICAL FIELD

The present invention relates to the technical field of riveting tools, in particular to a multi-purpose and simple riveting tool.

BACKGROUND

With the rapid progress of modern industry, compared with other connection methods, riveting has the advantages of reliable connection, corrosion resistance, light weight and simple technology, and it is frequently used in connecting objects. Compared with traditional riveting, users don't need to buy expensive air pump and air pump for simple riveting. At present, there are various riveting tools on the market, and users can rivet the connectors by themselves through the riveting tools, without buying expensive riveting equipment.

For example, the U.S. Pat. No. 15,375,086 discloses a single-handed riveting gun, which includes an L-shaped connector, a shell and a connecting shaft. The L-shaped connector connects the fixed shell and the connecting shaft respectively, and the functions of a screw riveting machine and a nut riveting machine can be realized by selecting the positions of the connecting holes. However, the riveting gun is cumbersome in the actual use process and cannot be applied to most nuts, which also increases the time and difficulty of riveting work to a certain extent.

For example, U.S. Pat. No. 17,130,010 discloses a multi-purpose riveting tool, which can be applied to rivet bolts with different purposes and sizes. However, the riveting tool is bulky and complicated, so it cannot be carried around for various application scenarios.

Based on the above problems, it is necessary to put forward a brand-new riveting tool, which can be applied to most nuts. At the same time, the riveting tool has the advantages of multi-purpose, simple structure and convenient use. Moreover, the riveting tool has a wide range of application scenarios, and can achieve riveting in ordinary families, personal DIY, car modification and photovoltaic occasions, thus further improving the efficiency of riveting work.

SUMMARY

The present invention provides a multi-purpose and simple riveting tool, which includes a male member, a female member and at least one rotating device; and
wherein the male member comprises a fixing part and a riveting part, wherein the fixing part comprises an accommodating groove with a threaded part; and
wherein the female member comprises an inner cavity with a depth; and
wherein the rotating device comprises a rotating shaft at least a part of which has a threaded part; and
wherein, the male member penetrates through the inner cavity, and the inner cavity is configured to only allow the male member to move axially in the inner cavity; and
wherein, the rotating shaft is screwed into the accommodating groove, so that the rotating device drives an axial movement of the male member in the inner cavity when rotating around at least one rotation axis.

The present invention further provides a multi-purpose and simple riveting tool, which includes a male member, a female member and at least one rotating device; and
wherein the male member comprises a fixing part and a riveting part, wherein the fixing part comprises an accommodating groove with a threaded part; and
wherein the female member comprises an inner cavity with a depth and at least one bottom cover for closing the inner cavity; and
wherein the rotating device comprises a rotating shaft at least a part of which has a threaded part; and
wherein, the male member penetrates through the inner cavity, and the inner cavity is configured to only allow the male member to move axially in the inner cavity; and
wherein, the rotating shaft is screwed into the accommodating groove, so that the rotating device drives the male member to move axially in the inner cavity when rotating around at least one rotation axis; and
wherein, when the male member penetrates through the inner cavity, the bottom cover closes the inner cavity and restricts the male member from leaving the inner cavity.

The present invention further provides a method for realizing riveting in daily life, which includes a multi-purpose and simple riveting tool and a workpiece to be riveted, wherein the riveting tool comprises a male member, a female member and at least one rotating device; and
wherein the male member comprises a fixing part and a riveting part, wherein the fixing part comprises an accommodating groove with a threaded part; and
wherein the female member comprises an inner cavity with a depth and a width; and
wherein the rotating device comprises a rotating shaft at least a part of which has a threaded part; and
wherein, the male member penetrates through the inner cavity, and the inner cavity is configured to only allow the male member to move axially in the inner cavity; and
wherein, the rotating shaft is screwed into the accommodating groove, so that the rotating device drives the male member to move axially in the inner cavity when rotating around at least one rotation axis; and
the workpiece to be riveted has an upper end and a lower end far away from the upper end, wherein a width of the lower end is greater than that of the inner cavity; and
the method comprises the following steps:
allowing the male member to penetrate into the inner cavity; and
threadedly connecting the rotating device to the male member; and
fixing the workpiece to be riveted on the riveting part; and
fixing the female member and rotating the rotating device to drive the male member to move axially; and
when the male member moves axially, the upper end of the workpiece to be riveted moves towards a direction close to the lower end.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
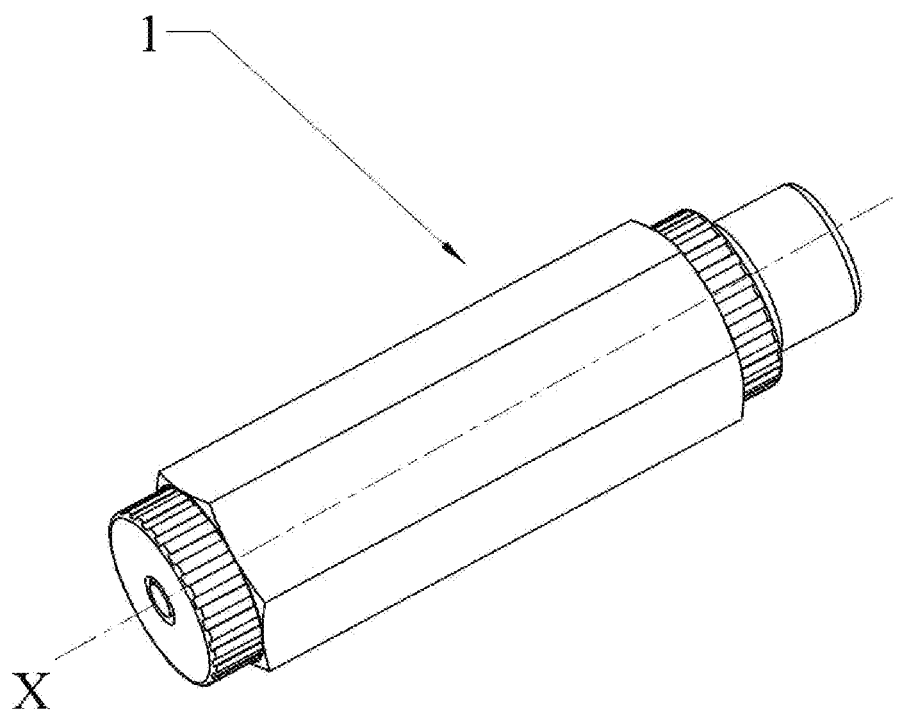
FIG. 1 is a schematic diagram of a riveting tool in the application of the present invention.

Riveting tool (1); Male member (100); Riveting part (110); Fixing part (120); Accommodating groove (130); Female member (200); Inner cavity (210); First end (220); Bottom cover (230); Fixing hole (231); Second end (240); Flange (241); Outer wall surface (242); Upper cover (250); Central through hole (251); Accommodating seat (260); Antiskid line (270); Rotating device (300); Rotating shaft (320); Rotating head (330); Bearing (400); Gasket (410); Groove (420); Rotation axis (x)

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale.

The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the present application, in order to make the riveting tool have the advantages of versatility, simple structure and convenient use, the present application provides a multi-purpose and simple riveting tool 1.

Referring to FIGS. 1 to 15, a multi-purpose and simple riveting tool 1 includes a male member 100, a female member 200 and at least one rotating device 300.

Figure 3:
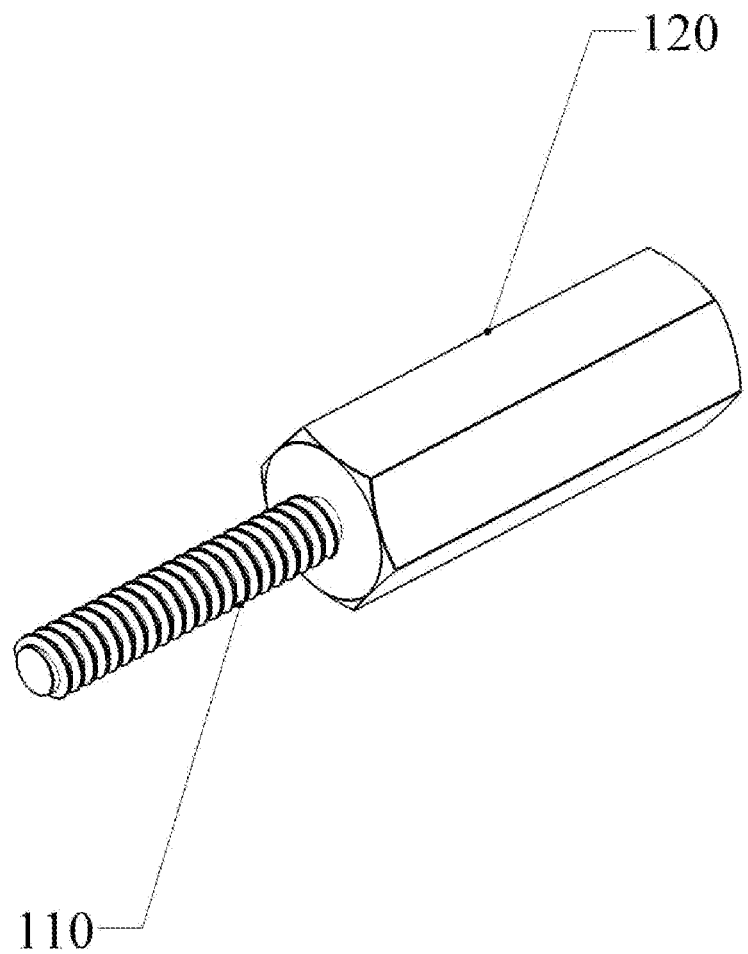
FIG. 3 is a schematic diagram of a male member in the application of the present invention.

Referring to FIG. 3, the male member 100 includes a fixing part 120 and a riveting part 110, and the riveting part 110 is provided with external threads. The parts to be riveted are the workpieces to be riveted. Because the workpieces to be riveted are usually nuts, the parts to be connected are riveted by nuts, and the riveting part 110 is fixed by external threads. In other embodiments, if riveting is required by other parts, the fixing structure on the riveting part 110 can also be changed according to the actual situation and is not limited to external threads.

Further, the riveting part 110 extends away from the female member 200, while the fixing part 120 is connected with the female member 200, and the riveting part 110 extends in the other direction. At the same time, the riveting part 110 and the fixing part 120 are integrally formed, and the integrally formed connection mode has many advantages, such as high efficiency, short production cycle and high production speed; reduced costs: integrated molding can improve production efficiency, thus reducing manufacturing costs; firm structure: the integrated structure is firm and firm; good stability: the integrated product has good stability and other advantages.

In other embodiments (not shown in the figure), the riveting part 110 and the fixing part 120 can also be connected by other connecting structures, including but not limited to the following: threaded connection; rivet connection, wherein nail with a cap can connect parts with holes, and this connection method is recommended to be designed inside the product, so as not to let users directly touch it to prevent scratches when using the product; plug-in, which evolved from mechanical pin connection, includes cylindrical pin, conical pin and special-shaped pin, and the reason why the cylinder is used is that the cylinder can rotate and move, and when the friction force is great, the pin is inserted in the form of rotation to fix the two parts with holes; bonding, that is, connecting two parts together by adhesive; keys, hooks, splines and pin connections, wherein the two parts are connected together through shape matching; interference connection, which realizes connection through elastic deformation of components; clamping sleeve connection, which connects the two parts together through the clamping sleeve; clamp connection, which connects the two parts together through a clamp.

Figure 4:
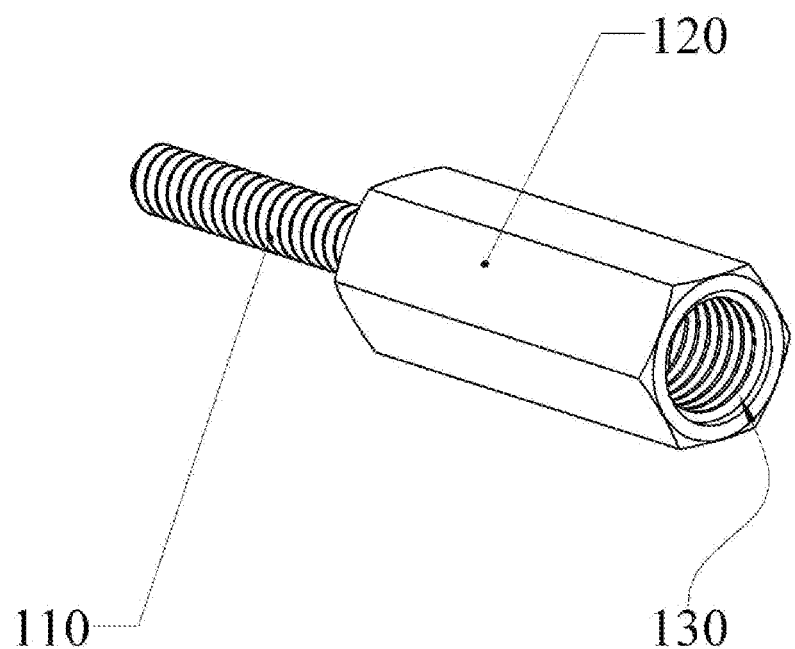
FIG. 4 is a schematic diagram of a male member in the application of the present invention.

Referring to FIG. 4, the fixing part 120 includes an accommodating groove 130 with a threaded part, which is used for connecting the rotating device 300. The thread is arranged in the accommodating groove 130 to complete riveting only by rotating, which makes the riveting work more convenient and quicker.

Figure 2:
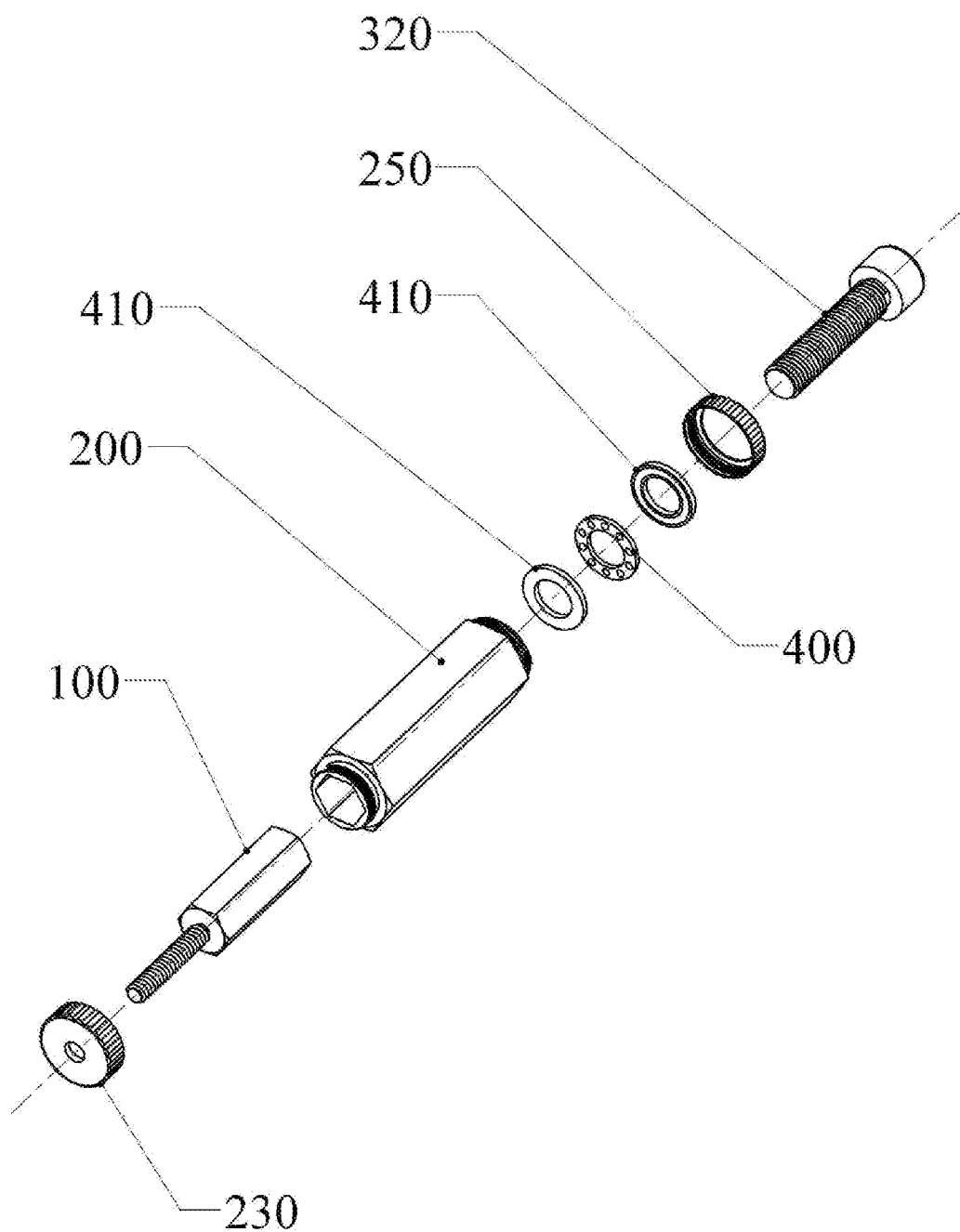
FIG. 2 is an exploded view of the riveting tool in the application of the present invention.
Figure 5:
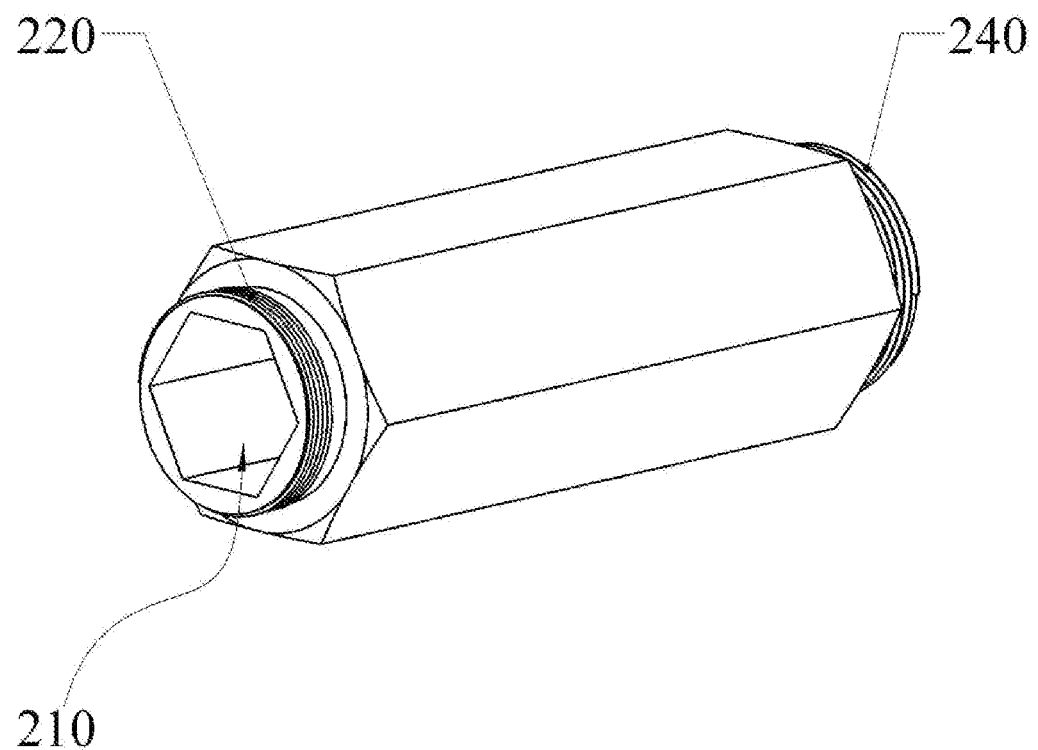
FIG. 5 is a schematic diagram of a female member in the application of the present invention.
Figure 6:
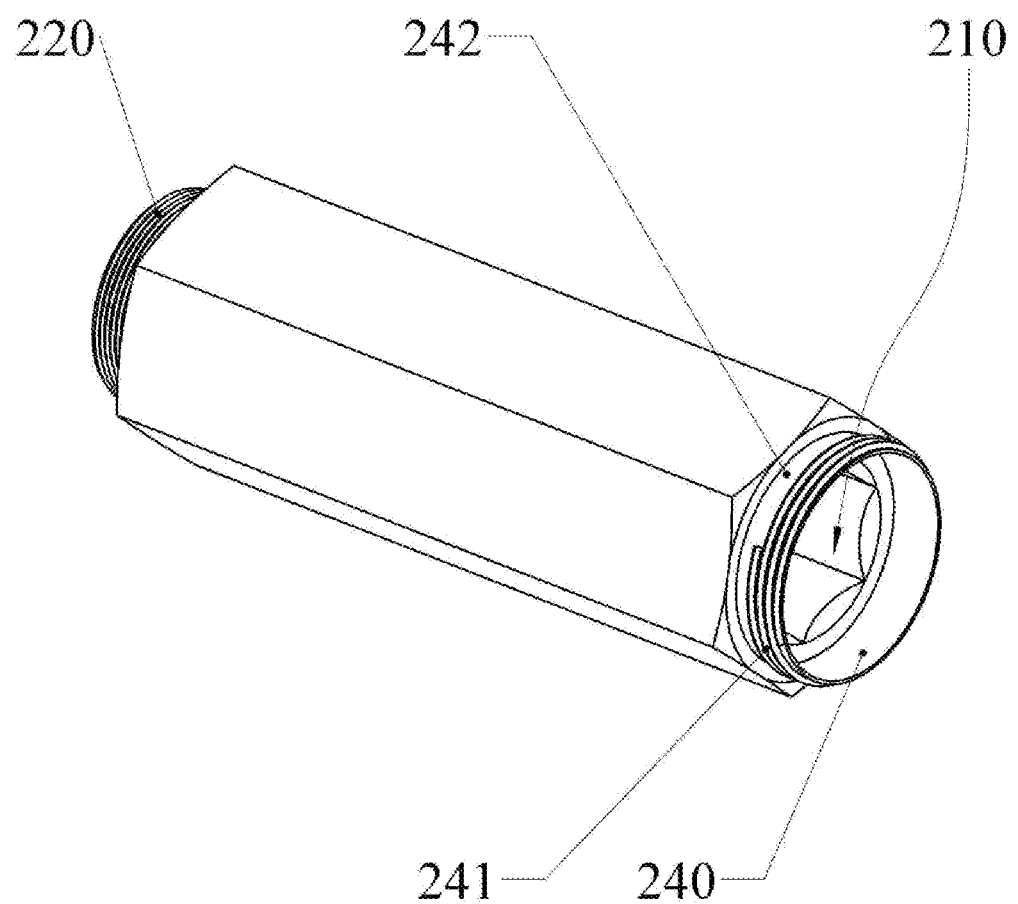
FIG. 6 is a schematic diagram of a female member in the application of the present invention.

Referring to FIGS. 5 and 6, the female member 200 includes an inner cavity 210 with a depth for accommodating the male member 100 and the rotating device 300. Meanwhile, the female member 200 extends away from the inner cavity 210 and is formed with a first end 220 and a second end 240, that is, the female member 200 is formed with the first end 220 and the second end 240 protruding outward at both ends. Referring to FIGS. 1 and 2, the first end 220 and the second end 240 are both provided with external threads, and the female member 200 is connected with a bottom cover 230 and an upper cover 250 through external threads, and the bottom cover 230 and the upper cover 250 are internally provided with internal threads and are connected with the female member 200 through threads. Wherein, the bottom cover 230 is connected with the first end 220, the upper cover 250 is connected with the second end 240, and the bottom cover 230 and the upper cover 250 are connected with the female member 200, so as to seal the female member 200 to ensure that the parts in the accommodating cavity 210 will not fall out of the female member 200.

Figure 7:
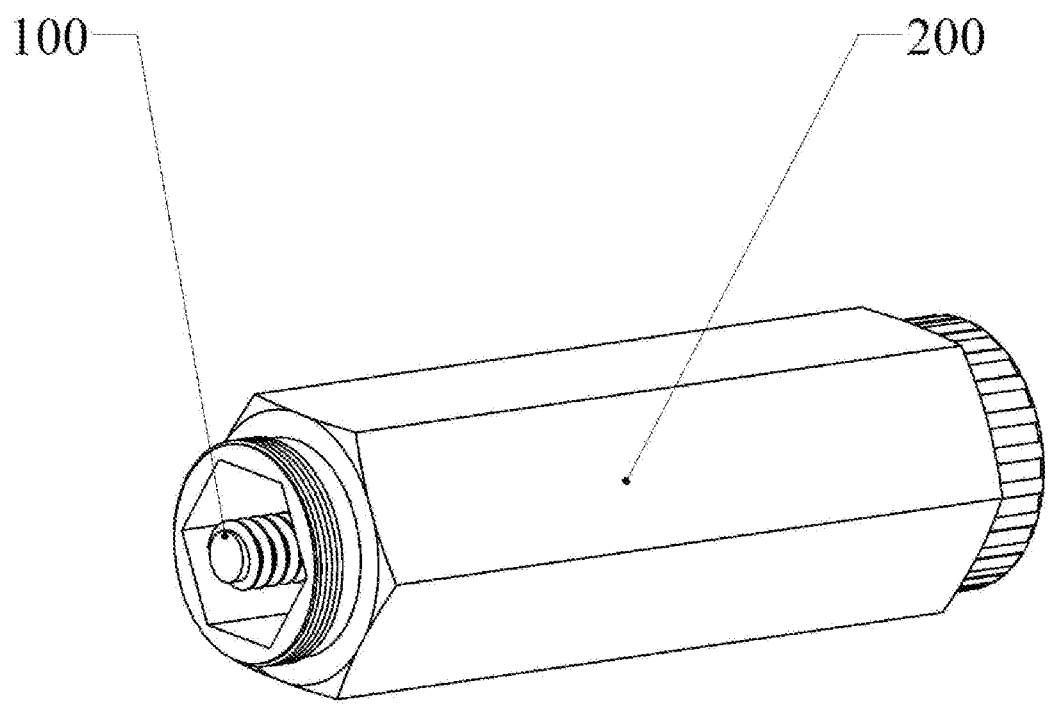
FIG. 7 is a schematic diagram of the connection between the male member and the female member in the application of the present invention.

Referring to FIGS. 2 and 7, the fixing part 120 is fixed in the inner cavity 210 in a form-fitting and non-rotatable manner, and the shape of the fixing part 120 is consistent with that of the female member 200, so that the male member 100 can be inserted into the inner cavity 210. When the male member 100 is accommodated in the inner cavity 210, at least part of the riveting part 110 is located outside the inner cavity 210, so that the workpiece to be riveted can be fixed by the riveting part 110.

In this embodiment, the shapes of the fixing part 120 and the female member 200 are both hexagonal prism structures. When the male member 100 is accommodated in the female member 200, the inner cavity 210 is configured to only allow the male member 100 to move axially in the inner cavity 210, that is, the male member 100 can only slide axially in the inner cavity 210 and cannot rotate. Therefore, the shape of the female member 200 needs to limit the rotation of the male member 100.

In other embodiments (not shown in the figure), the shapes of the female member 200 and the fixing part 120 can also be oval, square or other polygonal prism structures that can prevent the male member 100 from rotating.

Figure 8:
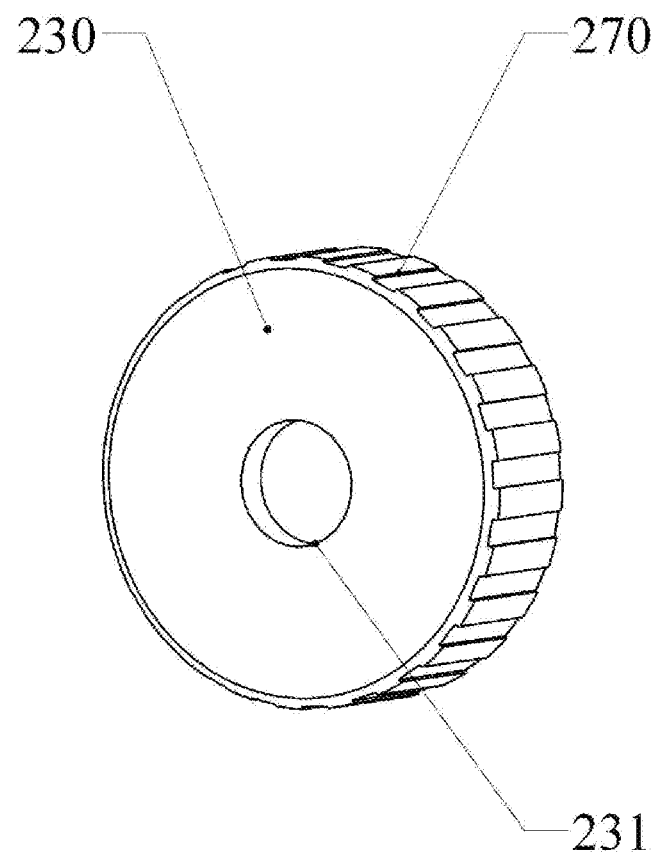
FIG. 8 is a schematic diagram of the bottom cover in the application of the present invention.
Figure 9:
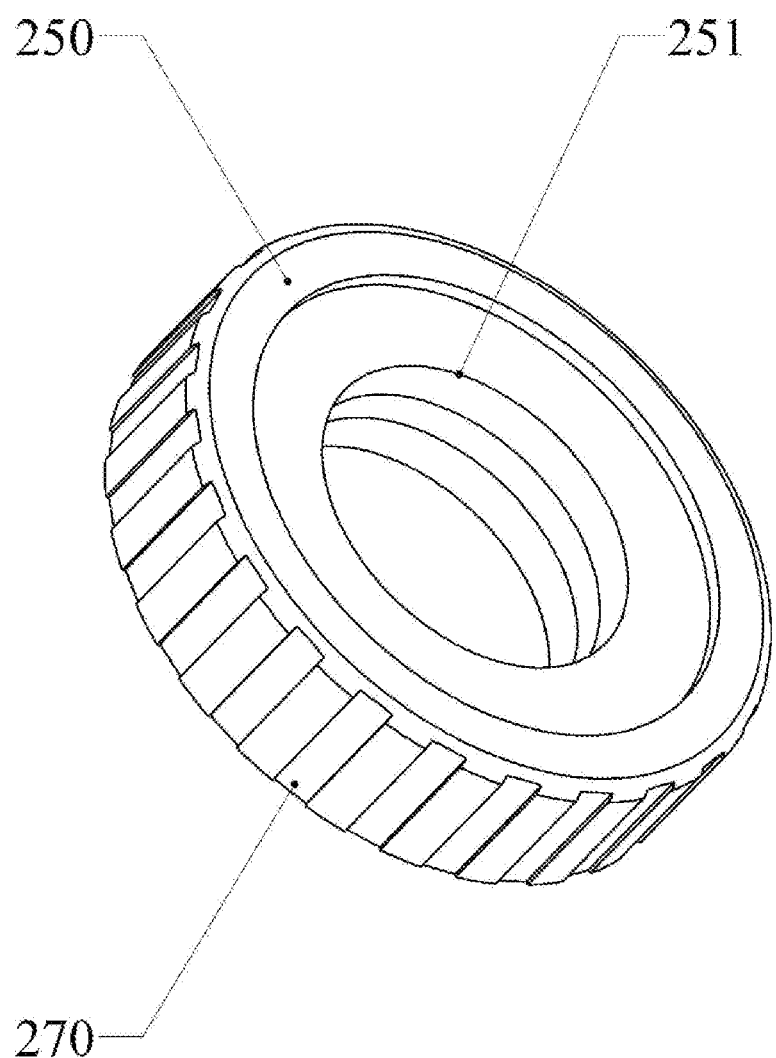
FIG. 9 is a schematic view of the upper cover in the application of the present invention.

Referring to FIGS. 8 and 9, the outer side of the bottom cover 230 and the outer side of the upper cover 250 are both provided with antiskid lines 270, which is convenient for users to install the bottom cover 230 and the upper cover 250 to both ends of the female member 200.

Referring to FIG. 1, the bottom cover 230 seals the male member 100 in the inner cavity 210 of the female member 200. The bottom cover 230 defines the moving track of the male member 100. The bottom cover 230 only allows the male member 100 to slide in the inner cavity 210 and cannot slide out of the inner cavity 210.

Further, as shown in FIGS. 1 to 8, the bottom cover 230 has a fixing hole 231 with a minimum diameter, and the riveting part 110 has a cylindrical structure with a maximum edge, and the maximum edge is not greater than the minimum diameter. Because different male members 100 correspond to different riveting parts 110, the size of the riveting part 110 is always smaller than the diameter of the fixing hole 231, that is, the riveting part 110 can pass through the fixing hole 231. When the bottom cover 230 fixes the male member 100 in the inner cavity 210, the riveting part 110 can expand and contract in the fixing hole 231, and the bottom cover 230 separates the fixing part 120 from the workpiece to be riveted. When the workpiece to be riveted is fixed on the riveting part 110, the workpiece to be riveted contacts the bottom cover 230 but cannot contact the fixing part 120.

Figure 10:
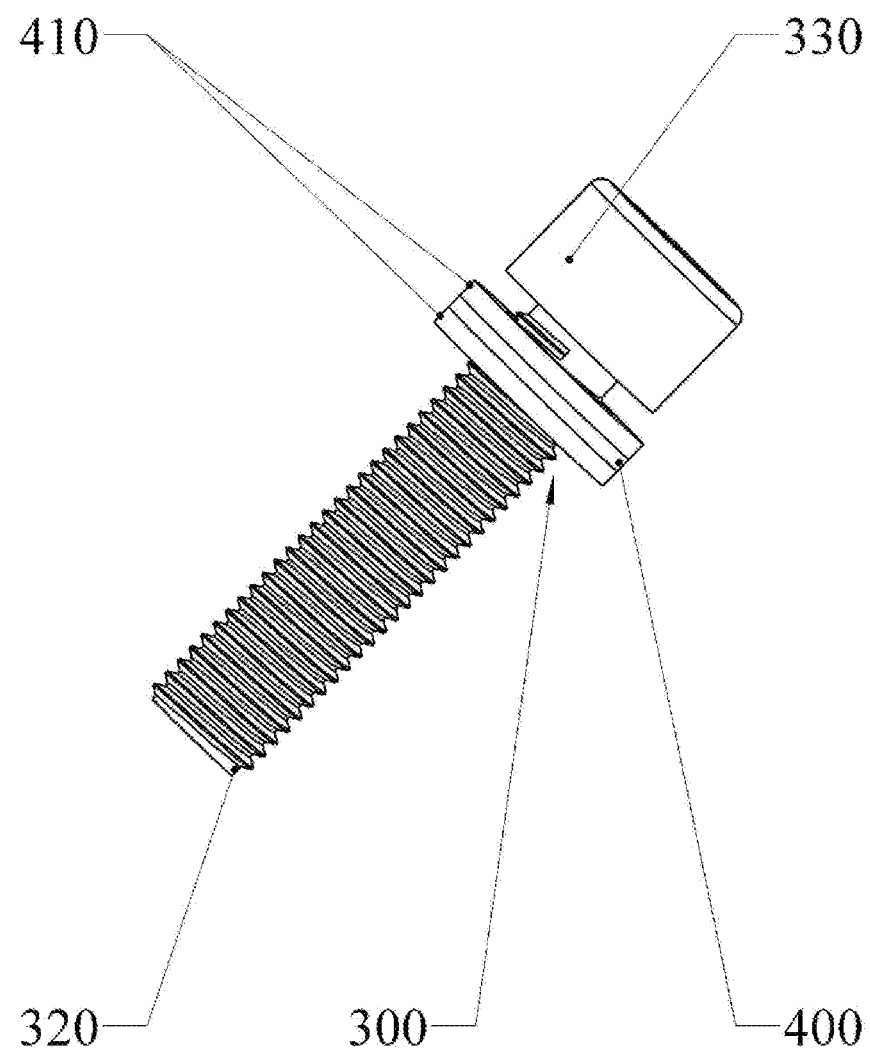
FIG. 10 is a schematic diagram of the rotating device in the application of the present invention.
Figure 11:
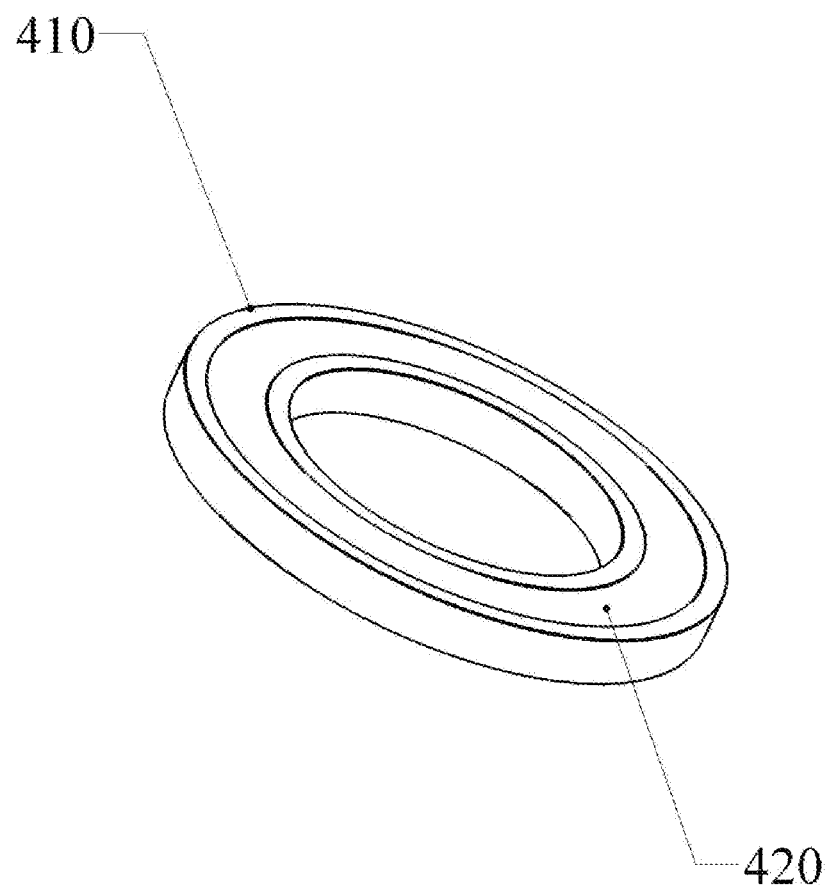
FIG. 11 is a schematic diagram of a gasket in the application of the present invention.
Figure 12:
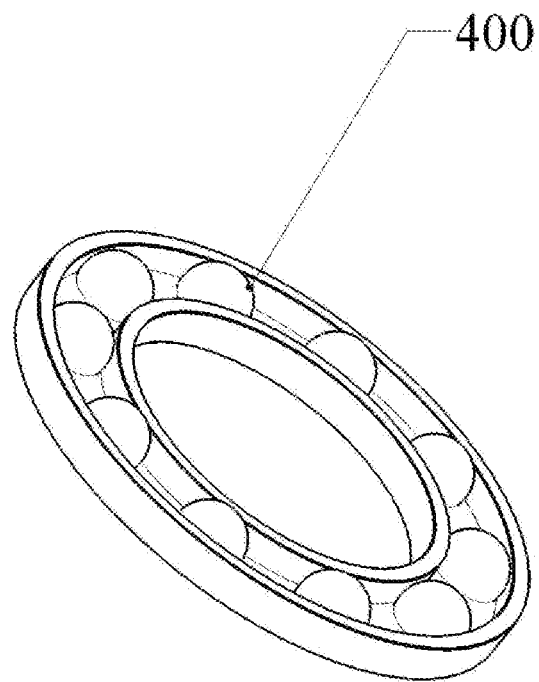
FIG. 12 is a schematic view of the bearing in the application of the present invention.

Referring to FIG. 10 to FIG. 12, the rotating device 300 includes the rotating shaft 320 at least a part of which has a threaded part and a bearing 400. The bearing 400 is arranged on the rotating shaft 320, and the bearing 400 is provided with two gaskets 410, the edges of which are raised upward to form a groove 420. Because steel balls are arranged around the bearing 400, the shape of the groove 420 is adapted to the shape of the bearing 400, and the groove 420 covers the steel balls; two gaskets 410 cover the bearing 400 in the middle.

Figure 13:
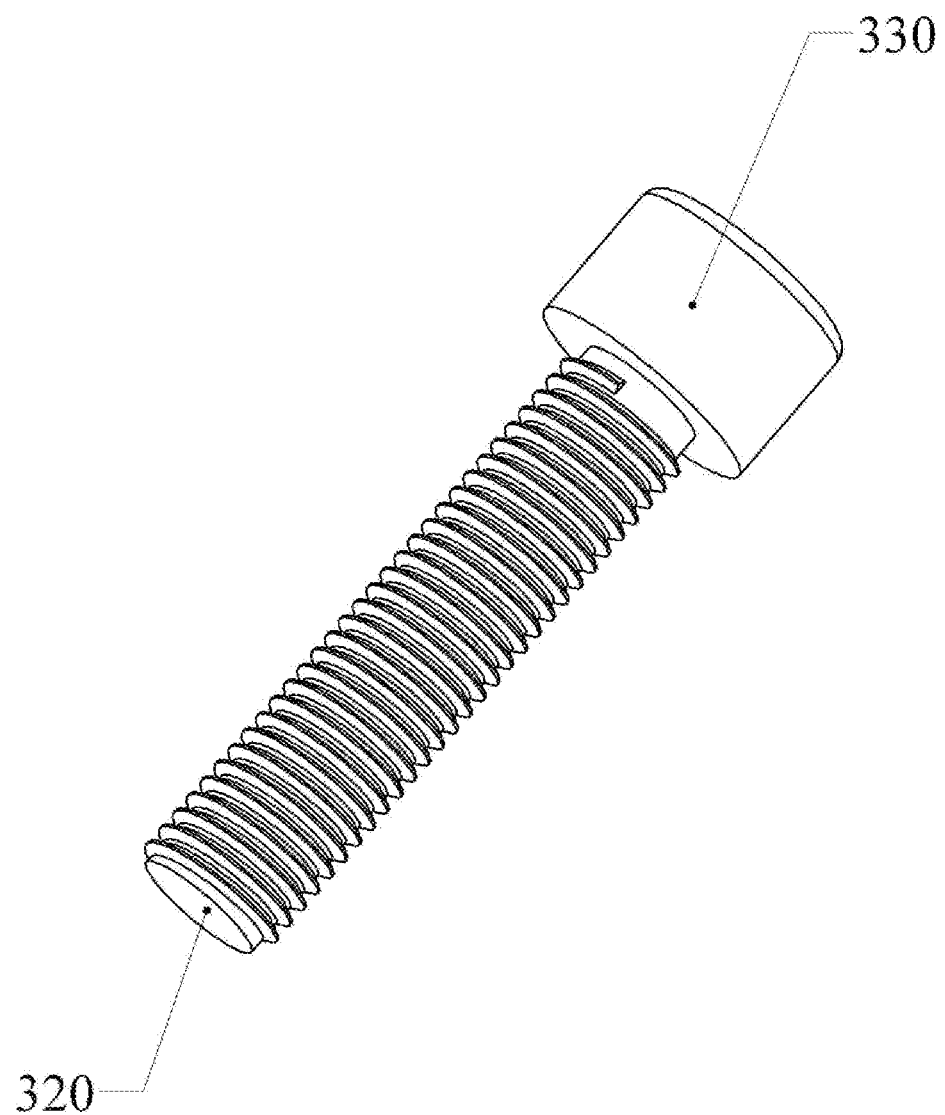
FIG. 13 is a schematic diagram of a rotating shaft in the application of the present invention.

Further, as shown in FIG. 13, the rotating shaft 320 is fixedly connected with the rotating head 330, and the rotating shaft 320 and the rotating head 330 are integrally formed. In this embodiment, the rotating device 300 is composed of a rotating screw and a bearing 400, and the bearing 400 functions to rotate the rotating screw in situ. In other embodiments (not shown in the figure), the rotating screw can also have other threaded structures, as long as the rotating shaft 320 can rotate through the threaded structure to realize the riveting function.

Figure 14:
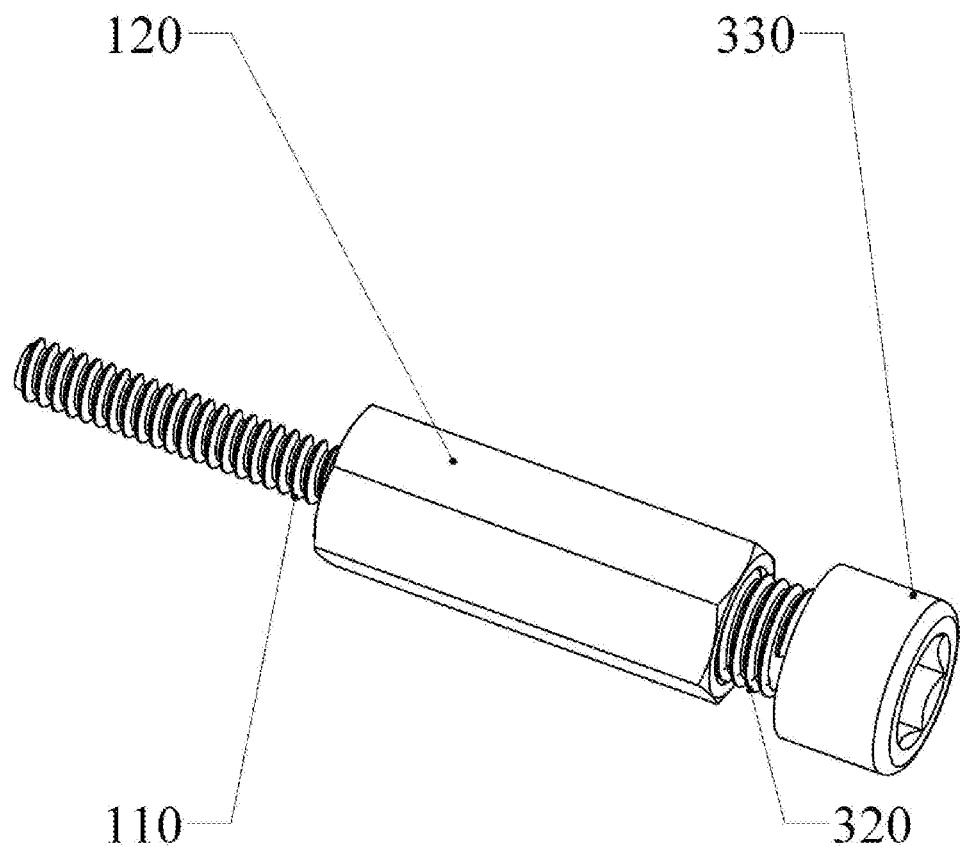
FIG. 14 is a schematic diagram of the connection between the male member and the rotating shaft in the application of the present invention.
Figure 15:
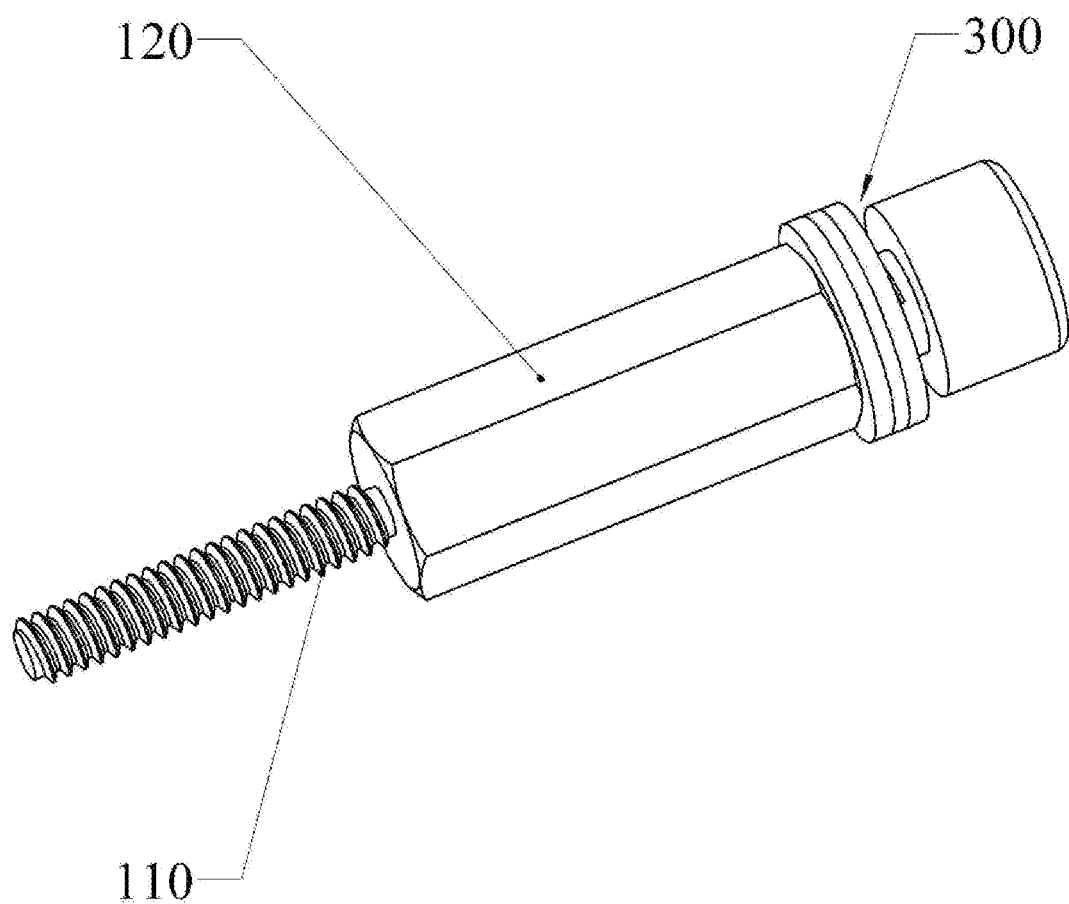
FIG. 15 is a schematic diagram of the connection between the male member and the rotating device in the application of the present invention.

Referring to FIGS. 14 and 15, the rotating shaft 320 is screwed into the accommodating groove 130 of the male member 100. Specifically, because the male member 100 is assembled in the inner cavity 210 of the female member 200, the rotating shaft 320 can be driven to rotate by rotating the rotating head 330, so that the axial movement of the male member 100 in the female member 200 can be realized.

Figure 16:
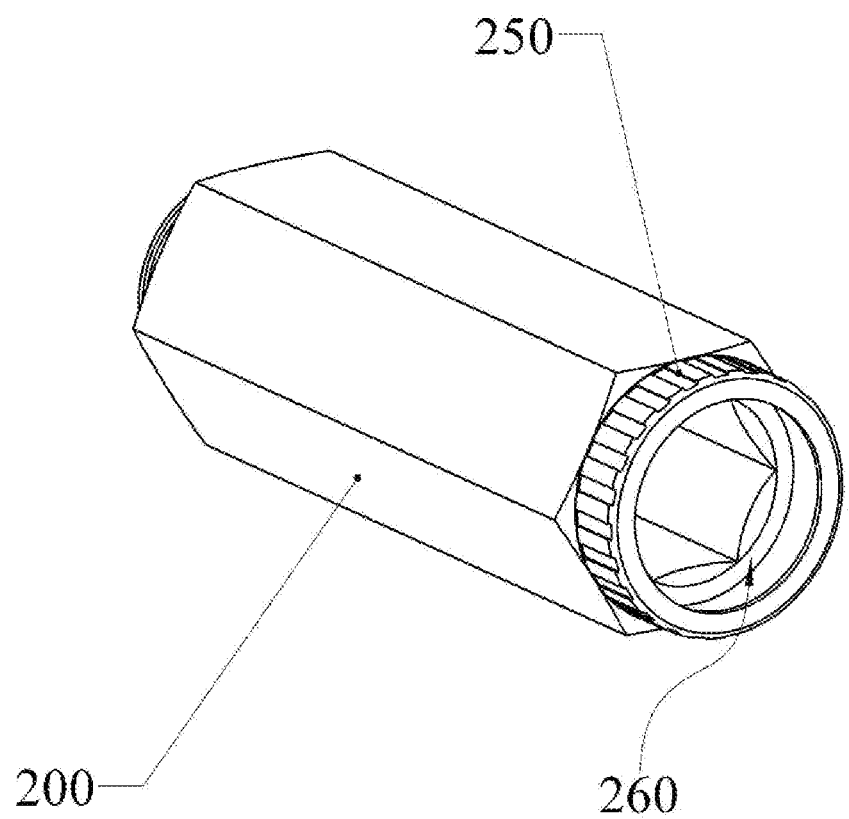
FIG. 16 is a schematic diagram of the connection between the female member and the upper cover in the application of the present invention.

Further, referring to FIGS. 6 and 16, the second end 240 of the female member 200 extends away from the inner cavity 210 to form a flange 241, that is, the boundary of the second end 240 protrudes outward to form the flange 241, and an accommodating seat 260 is formed between the flange 241 and the inner cavity 210. In the whole assembly process, because the flange 241 has an outer wall surface 242, the outer wall surface 242 is provided with external threads, and the outer wall surface 242 is connected with the upper cover 250 through external threads, and the accommodating seat 260 is used for accommodating a bearing 400.

Figure 17:
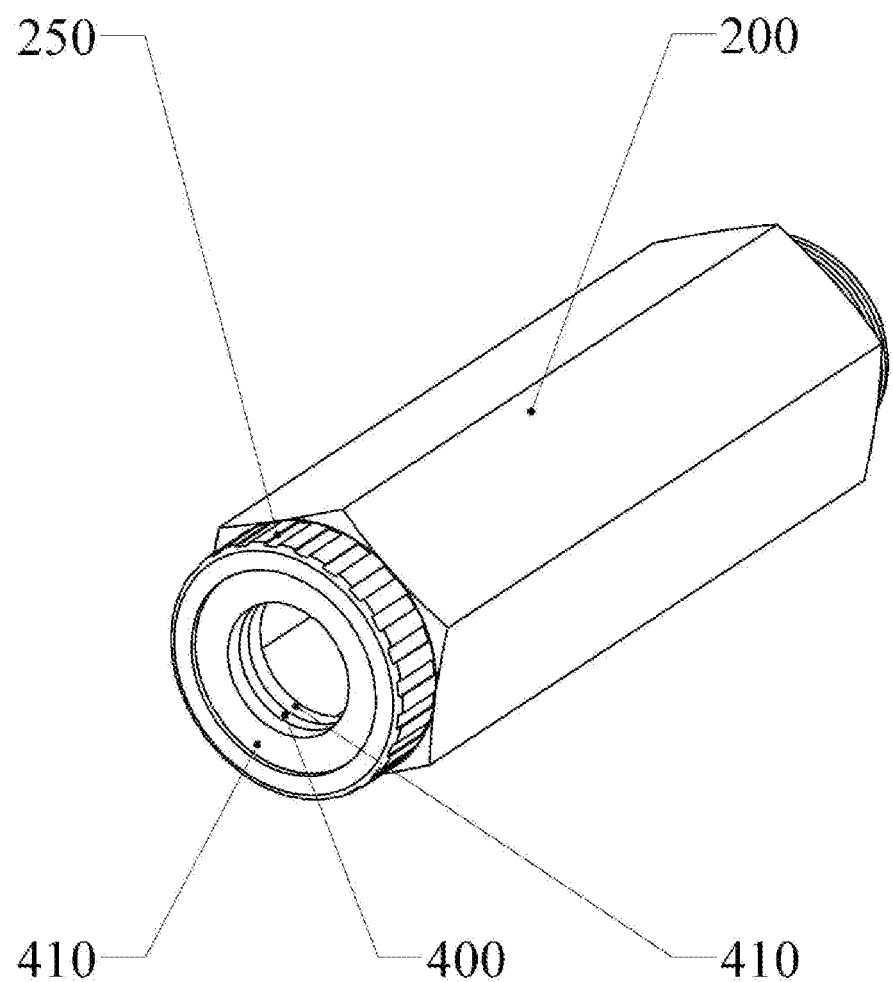
FIG. 17 is a schematic diagram of the connection between the female member and the bearing in the application of the present invention.

Referring to FIG. 17, the bearing 400 is assembled between the inner cavity 210 and the upper cover 250, and the bearing 400 is arranged between two gaskets 410, and both the bearing 400 and the two gaskets 410 are arranged on the accommodating seat 260. The upper cover 250 is fixed above the bearing 400 and the two gaskets 410 by threaded connection, which limits the bearing 400 and the two gaskets 410 and prevents the bearing 400 and the two gaskets 410 from falling out of the accommodating seat 260.

Figure 18:
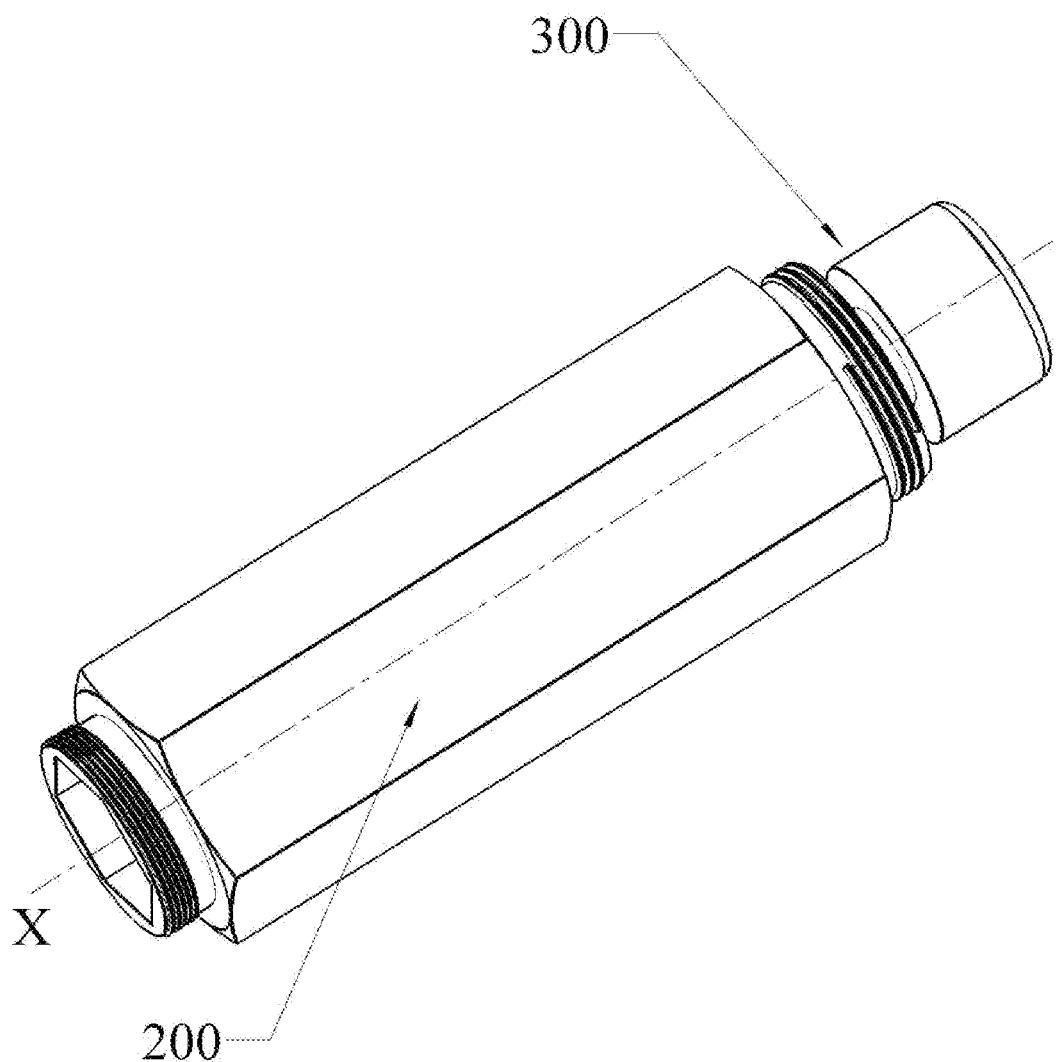
FIG. 18 is a schematic diagram of the connection between the female member and the rotating device in the application of the present invention.

Further, as shown in FIGS. 9 and 17, the upper cover 250 has a central through hole 251, and the inner cavity 210 can communicate with the outside through the central through hole 251, that is, the inner cavity 210 can communicate with other parts through the central through hole 251 to create a connection relationship. Referring to FIG. 18, the rotating shaft 320 is fixed in the inner cavity 210 through the central through hole 251, and the rotating head 330 is located at the end far away from the inner cavity, that is, one end of the rotating shaft 320 extends into the inner cavity 210, while the rotating head 330 is located at the end that does not extend into the inner cavity 210.

Specifically, as shown in FIGS. 1 to 18, all parts in the riveting tool 1 are detachably connected. When the riveting tool 1 needs to be used, firstly, the male member 100 needs to be put into the inner cavity 210, and the male member 100 can slide in the inner cavity 210, and then the male member 100 is fixedly confined in the inner cavity 210 by the bottom cover 230 to prevent the male member 100 from slipping out of the female member 200; secondly, the bearing 400 and the two gaskets 410 are accommodated in the accommodating seat 260 of the female member 200, and the bearing 400 and the two gaskets 410 are fixed by the upper cover 250 to prevent the bearing 400 and the two gaskets 410 from slipping out of the female member 200; then, the rotating shaft 320 extends into the inner cavity 210 through the central through hole 251 of the upper cover 250, and the rotating shaft 320 is connected with the male member 100 in the inner cavity 210 through threaded connection, and the rotating device 300 can rotate around a rotation axis X in the inner cavity 210. Due to the bearing 400, the rotating shaft 320 can rotate in situ and drive the male member 100 to move axially in the inner cavity 210.

As a preferred embodiment of the application of the present invention, the application of the present invention further provides a method for realizing riveting in daily life. First of all, it needs to have a multi-purpose and simple riveting tool 1 and the workpiece to be riveted and assemble the riveting tool 1. The workpiece to be riveted has an upper end and a lower end, and the width of the lower end is greater than that of the upper end. When it is necessary to use the riveting tool 1 to rivet two connectors, in this embodiment, two steel plates are taken as examples, and in other embodiments, the riveting tool 1 can also rivet other parts.

First, it is necessary to select the male member 100 that matches the size of the workpiece to be riveted, so that the workpiece to be riveted can be installed on the male member 100. When fixing the workpiece to be riveted, the riveting part 110 passes through the lower end and the upper end successively, and the end with large width is close to the female member 200. Subsequently, the riveting part 110 and the workpiece to be riveted pass through the two steel plates, and the female member 200 is fixed by tools, so that the female member 200 cannot rotate during the riveting process. Then, the rotating shaft 320 is driven to rotate by rotating the rotating head 330, so as to realize the axial movement of the male member 100 in the inner cavity 210. When the male member 100 moves axially in the inner cavity 210, the male member 100 will move along the inner cavity 210. Due to the existence of the bottom cover 230, the workpiece to be riveted will be resisted on the bottom cover 230, which restricts the moving path of the workpiece to be riveted, so that the workpiece to be riveted cannot move with the male member 100. Therefore, when the male member 100 moves, because the workpiece to be riveted is fixed on the male member 100, the male member 100 and the bottom cover 230 will generate a pressing force on the workpiece to be riveted. With the movement of the male member 100, the pressing force will become larger and larger, so that the upper end of the workpiece to be riveted will be pressed towards the square at the lower end, resulting in deformation, thus completing the riveting work on two steel plates and connecting and fixing the two steel plates.

In another embodiment, the female member 200 is provided with a fixing part, and the fixing part and the female member 200 can be welded, integrally formed threadedly connected and other connection manners. Through the fixing part, the female member 200 can be fixed without additional tools, such as wrenches and other fixing tools, and the female member 200 cannot rotate during the riveting process directly through the fixing part. The fixing part can be a handle, or other grasping parts, or various other structures that can be used to fix the female member 200. The specific structure can be flexibly changed according to the user's situation and the use scene, as long as the female member 200 does not rotate during the riveting process.

When the riveting work is completed, the male member 100 is separated from the workpiece to be riveted, and the parts of the riveting tool 1 can be disassembled, so that the riveting tool 1 can be stored.

In this embodiment, the riveting tool 1 is mainly made of hard metal materials. Using metal materials can make the riveting tool 1 have higher strength, toughness and hardness, and can bear greater external force and deformation. At the same time, the metal material is not easy to burn, and its properties change little with the temperature change, and the metal material is not easy to age, be damaged and be contaminated with dust and dirt. Moreover, metal materials have the advantages of excellent fluidity, low cost, good wear resistance, low solidification shrinkage, high compressive strength and good machinability.

In other embodiments (not shown in the figure), the riveting tool 1 can also be made of other hard materials, including but not limited to cemented carbide, which is an alloy material made of a hard compound of a refractory metal and a bonding metal by powder metallurgy process. Cemented carbide has a series of excellent properties such as high hardness, wear resistance, good strength and toughness, heat resistance and corrosion resistance; magnetic material: magnetic material is a kind of material that can be magnetized, and it has good hardness and strength and other qualified hard materials. The specific material type depends on the use situation.

To sum up, the riveting tool 1 provided by the present invention can be applied to most nuts, and at the same time, the riveting tool 1 has the advantages of multi-purpose, simple structure, convenient use, etc. Moreover, the application scene of the riveting tool 1 is wide, and it can realize riveting in ordinary families, personal DIY, car modification, photovoltaic and other occasions, thus further improving the efficiency of riveting work.

In addition, this multi-purpose and simple riveting tool has the following advantages: it is convenient, and can be widely used in products that are not easy to weld, such as thin plates and tubes, and it can replace the traditional welding processing method in a certain range; it can be used at a single side of the connector to achieve excellent thin-walled riveting, sealing riveting, single-sided riveting and other functions; economic installation cost: because the installation is easy and convenient, it saves time, effort and money; simple: only one tool is needed for unilateral construction, which is not affected by the closure of objects; the workpiece will not be damaged: during the riveting process, the workpiece will not be damaged; convenient and hygienic operation: the riveting tool is convenient and hygienic to operate; labor-saving, time-saving, simple and accurate: riveting tools can save labor and time, and the operation is simple and accurate.

In the broad sense of the application of the present invention, the working principle of the riveting tool 1 can be widely used in many fields and scenes, including but not limited to the following: automobile and automobile parts manufacturing: in the process of automobile design and manufacturing, the riveting tool can be used to connect automobile body structures, doors, hoods, roofs, seats and other parts; aerospace industry: in the aerospace industry, riveting tools can be applied to the connection of aircraft fuselage structure, wings, tails and other components; manufacturing of electronic and electrical equipment: in the manufacturing of electronic and electrical equipment, riveting tools can be used to connect circuit boards, radiators, cabinets, cable brackets and other components; furniture manufacturing: riveting tools can be used to connect furniture parts of wood, metal or other materials, such as chairs, tables, cabinets, etc.; packaging industry: in the packaging industry, riveting tools can be used to connect handles, supporting structures and other parts of cardboard boxes to increase the strength and stability of packaging; manufacture of household appliances and kitchen utensils: riveting tools can be used to connect metal shells, handles, fixed brackets and other parts of household appliances and kitchen utensils; installation of pipelines and pipeline systems: in the installation of pipelines and pipeline systems, riveting tools can be used to connect pipelines, flanges, pipeline supports and other components.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A multi-purpose and simple riveting tool, comprising a male member, a female member and at least one rotating device; and
    wherein said male member comprises a fixing part and a riveting part, wherein said fixing part comprises an accommodating groove with a threaded part; and
    wherein said female member comprises an inner cavity with a depth; and
    wherein said at least one rotating device comprises a rotating shaft at least a part of which has a threaded part; and
    wherein, said male member penetrates through said inner cavity, and said inner cavity is configured to only allow said male member to move axially in said inner cavity; and
    wherein, said rotating shaft is screwed into said accommodating groove, so that said at least one rotating device drives an axial movement of said male member in said inner cavity when rotating around at least one rotation axis; and wherein an external thread is arranged on said riveting part and said riveting part fixes a workpiece to be riveted through said external thread, and when said male member is placed in said inner cavity, at least part of said riveting part is outside said inner cavity; and wherein said riveting part and said fixing part are integrally formed, and said fixing part is accommodated in said inner cavity in a form-fitting and non-rotatable manner.

2. The riveting tool according to claim 1, wherein said female member extends away from said inner cavity to form a first end and a second end and said first end and said second end are respectively connected with a bottom cover and an upper cover, which enclose said female member.

3. The riveting tool according to claim 2, wherein an outer sides of said bottom cover and an outer side of said upper cover are both provided with anti-skid lines and said bottom cover and said upper cover are fixed at both ends of said female member through threaded connection.

4. The riveting tool according to claim 3, wherein said at least one rotating device comprises a bearing, said bearing is assembled between said inner cavity and said upper cover, and said bearing is configured to rotate said rotating shaft in situ.

5. A multi-purpose and simple riveting tool, comprising a male member, a female member and at least one rotating device; and wherein said male member comprises a fixing part and a riveting part, wherein said fixing part comprises an accommodating groove with a threaded part; and wherein said female member comprises an inner cavity with a depth and at least one bottom cover for closing said inner cavity; and wherein said at least one rotating device comprises a rotating shaft at least a part of which has a threaded part; and wherein, said male member penetrates through said inner cavity, and said inner cavity is configured to only allow said male member to move axially in said inner cavity; and wherein, said rotating shaft is screwed into said accommodating groove, so that said at least one rotating device drives said male member to move axially in said inner cavity when rotating around at least one rotation axis; and wherein, when said male member penetrates through said inner cavity, said at least one bottom cover closes said inner cavity and restricts said male member from leaving said inner cavity;

wherein said riveting part is provided with external threads, and when said male member is located in said inner cavity, at least part of said riveting part is located outside said inner cavity;

wherein said riveting part is formed by extending away from said female member;

wherein said female member extends away from said inner cavity to form a first end and a second end, said first end is detachably connected with said at least one bottom cover through threads, and said second end is provided with an upper cover, and said at least one bottom cover and said upper cover close said female member; and wherein said first end is provided with external threads, said at least one bottom cover is provided with internal threads, said at least one bottom cover and said female member are connected by threads, and said at least one bottom cover defines a moving track of said male member.

6. The riveting tool according to claim 5, wherein said at least one bottom cover is provided with a fixing hole with a minimum diameter and said riveting part has a cylindrical structure with a maximum edge, and said maximum edge is not greater than said minimum diameter, so that said riveting part can be inserted into said fixing hole.

7. The riveting tool according to claim 6, wherein said at least one rotating device comprises a bearing, which is assembled between said inner cavity and said upper cover and is configured to rotate said rotating shaft in situ.

8. The riveting tool according to claim 7, wherein said second end extends away from said inner cavity to form a flange and said flange and said inner cavity together define an accommodating seat, and said accommodating seat is configured to place said bearing.

9. The riveting tool according to claim 8, wherein said bearing is equipped with two gaskets, and a edges of said two gaskets protrude upwards to form grooves, and said grooves are arranged on said two gaskets in a circular shape, and the shapes of said grooves are matched with that of said bearing, and said bearing is covered by said two gaskets.

10. The riveting tool according to claim 9, wherein said flange has an outer wall surface with external threads and said outer wall surface is connected with said upper cover through the external threads and said upper cover limits said bearing and said two gaskets.

11. The riveting tool according to claim 10, wherein said upper cover has a central through hole, and said inner cavity can communicate with outside through said central through hole and said rotating shaft can rotate in situ in said inner cavity through said central through hole.

12. The riveting tool according to claim 11, wherein said rotating shaft is fixedly connected with a rotating head which is located at one end far away from said inner cavity, and said rotating head is rotated to drive said rotating shaft to rotate so as to realize a movement of said male member; and said female member and said male member are made of hard materials.

* * * * *